Figure 1:
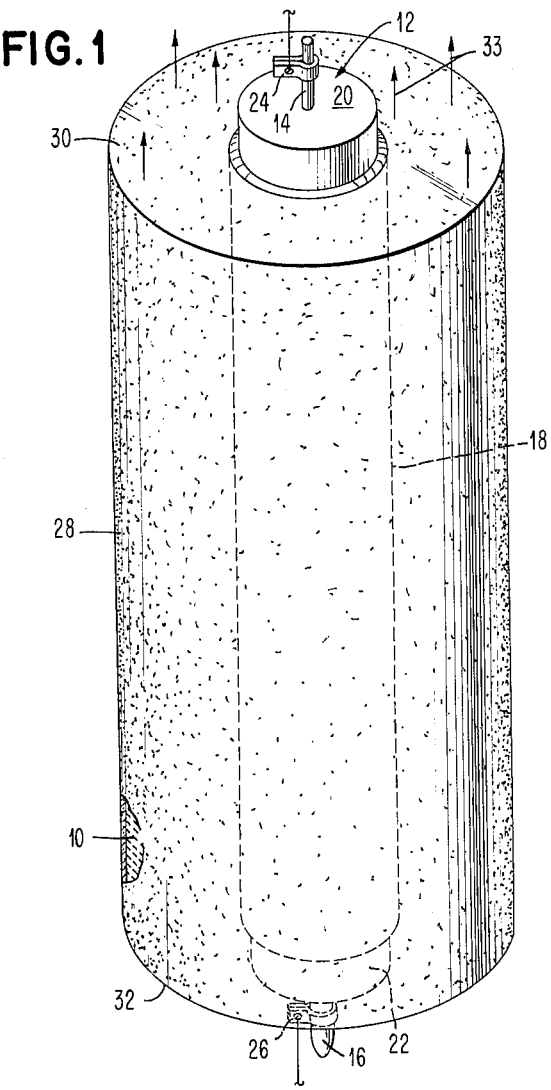

July 19, 1966 W. REUTER ETAL 3,262,070
VACUUM ENCAPSULED EXPLODING WIRE RADIANT ENERGY
SOURCES AND LASER EMBODYING SAME
Filed March 26, 1962 3 Sheets-Sheet 1

INVENTORS
WILHAD REUTER
MIREK J. STEVENSON

BY Stephen J. Limanek
ATTORNEY

July 19, 1966   W. REUTER ETAL   3,262,070
VACUUM ENCAPSULED EXPLODING WIRE RADIANT ENERGY
SOURCES AND LASER EMBODYING SAME
Filed March 26, 1962   3 Sheets-Sheet 3

United States Patent Office 3,262,070
Patented July 19, 1966

3,262,070
VACUUM ENCAPSULED EXPLODING WIRE RADIANT ENERGY SOURCES AND LASER EMBODYING SAME
Wilhad Reuter, Mahopac, and Mirek J. Stevenson, Briarcliff Manor, N.Y., assignors to International Business Machines Corporation, New York, N.Y., a corporation of New York
Filed Mar. 26, 1962, Ser. No. 182,242
13 Claims. (Cl. 331—94.5)

This invention relates to improved radiant energy sources and more particularly to apparatus for producing high intensity electromagnetic radiation at infrared, visible and ultraviolet, that is, optical, frequencies.

On many occasions it is necessary or at least desirable to produce a short intense pulse of optical energy, either coherent or incoherent. Such incoherent pulses or radiation have been produced, as is known, by exploding fine metallic wires. Suitable exploding wires may be made of, for example, tungsten, copper, aluminum and molybdenum, which can readily conduct large currents therethrough. In order to explode one of these wires, large currents are passed through the wire by connecting the wire across a charged high voltage capacitor which rapidly releases its energy.

The wire explosion is characterized by two phases:
(1) A heating phase, during which the wire is heated to a melting temperature.
(2) A diffusion phase, during which droplets are diffused into vaporized gas.

The heating phase lasts only a fraction of a microsecond to several microseconds. The wire melts at the end of this period into a number of small droplets like aerosol in air.

During the diffusion period the electrical resistance gradually decreases and the diffused droplets take on a character of a gas similar to a gas suitable for gas discharges. Initially when the gas density is high and the droplets are only slightly dispersed, that is, separated by only short distances from each other, the resistance is high. This is due to the fact that the mean free path of electrons is so short that electrons cannot acquire sufficient energy to ionize other atoms by impact. The principal sources of carriers at this stage are thermionic emission and field emission. At the end of the diffusion period the pressure drops sufficiently providing much greater means free path for electrons and avalanching occurs with consequently much lower resistance. The explosion is caused principally by the high current conduction during the gas phase.

At times it is necessary to use not only a pulse of high intensity radiations, but high intensity radiation at only one narrow band of frequencies. At other times it is desirable to use high intensity radiations having a wide band of frequencies, and preferably a continuum. When wires, such as those mentioned hereinabove, are exploded they often produce high intensity radiation only at widely scattered frequencies.

As is known, lasers or optical masers are used to produce coherent optical radiation. It is also known that lasers using a gas as the active or negative temperature medium require pumping sources producing high intensity radiations confined to a fine spectral line, whereas certain solid state lasers are preferably pumped by a source producing radiations having a wide frequency band or a continuum.

Accordingly, an object of this invention is to provide an improved radiation energy source.

Another object of this invention is to provide an improved source for producing high intensity radiation at optical frequencies.

A further object of this invention is to provide an improved radiation energy source by using explosion techniques.

Yet another object of this invention is to provide an improved radiation source which produces a continuum of radiant energy.

Yet another object of this invention is to provide an exploding wire source which prevents the deposition of metal vapors on associated circuit elements.

Still a further object of this invention is to provide an improved exploding wire radiation source which produces only slight shock waves and negligible vibration and sound waves.

An additional object of this invention is to provide an improved laser or optical maser producing coherent output radiation of a higer intensity than those produced from prior art lasers or optical masers.

Yet another object of this invention is to provide an improved laser or optical maser which uses an exploding wire as a pumping source.

Yet a further object of this invention is to provide an improved radiation source which may be operated at cryogenic temperatures.

In accordance wtih the present invention, a high intensity coherent energy source is provided by applying radiant energy produced by an exploding wire encapsuled in a vacuum to an active or negative temperature medium.

An important advantage of this invention is that wire may be exploded near or within the active medium of a laser without shock waves damaging the medium.

An important feature of this invention is that by varying the dimensions of the vacuum surrounding the exploding wire spectral lines or a continuum of radiation may be produced from wires of a given material.

The foregoing and other objetcs, features and advantages of the invention will be apparent from the following more particular description of a preferred embodiment of the invention, as illustrated in the accompanying drawings.

Figure 3:
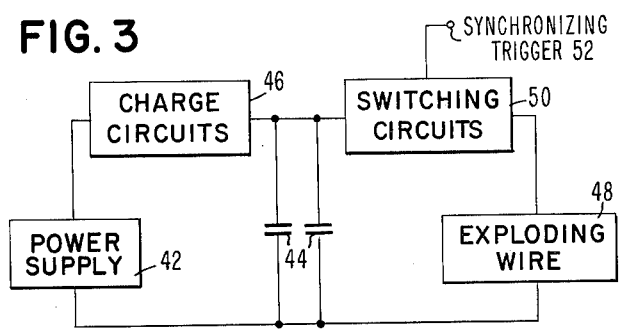
Figure 4:
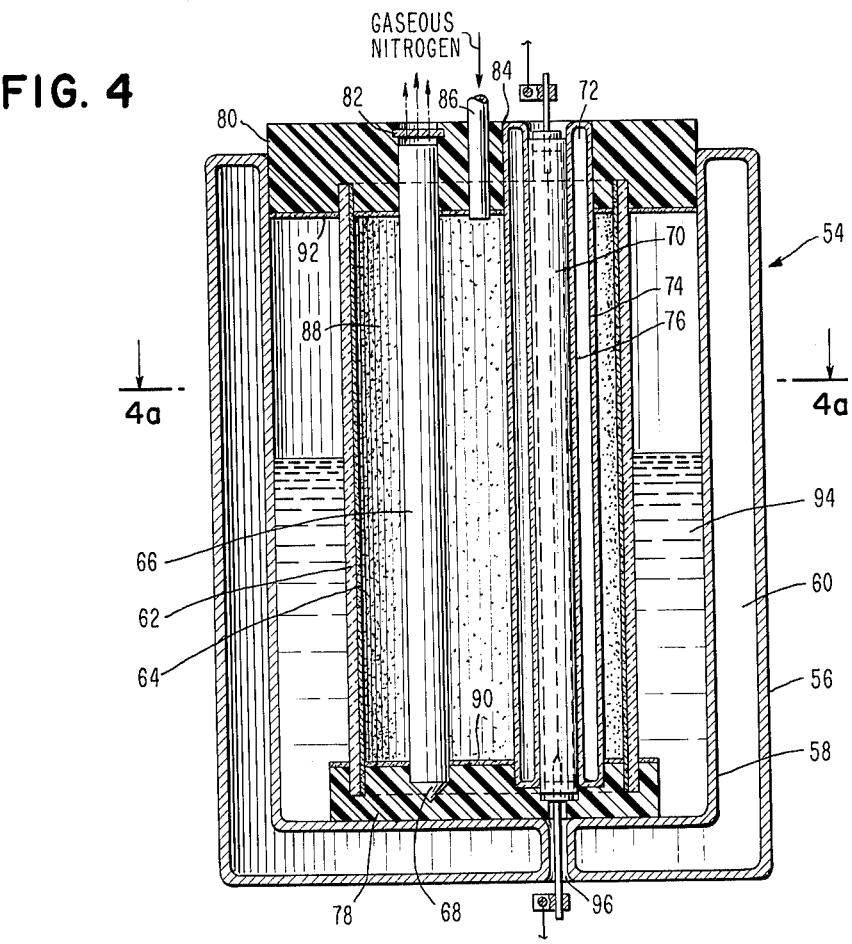
Figure 4A:
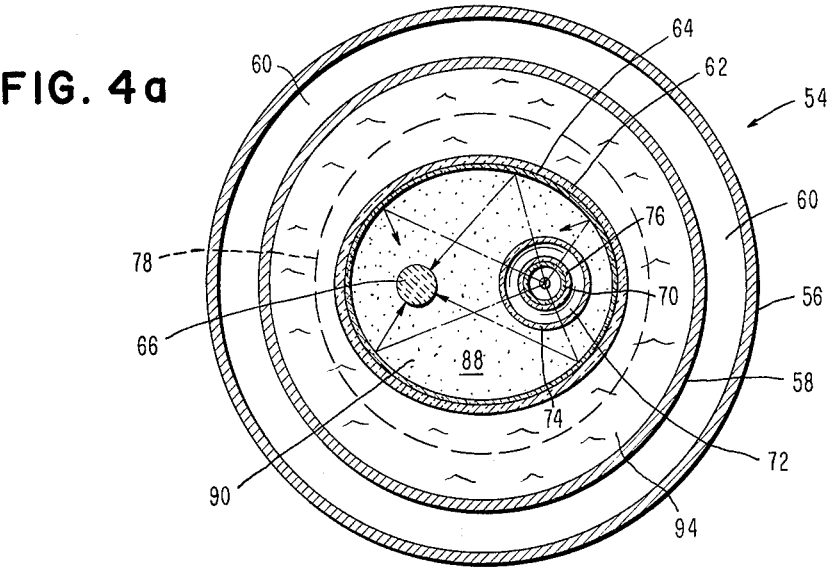
Figure 5:
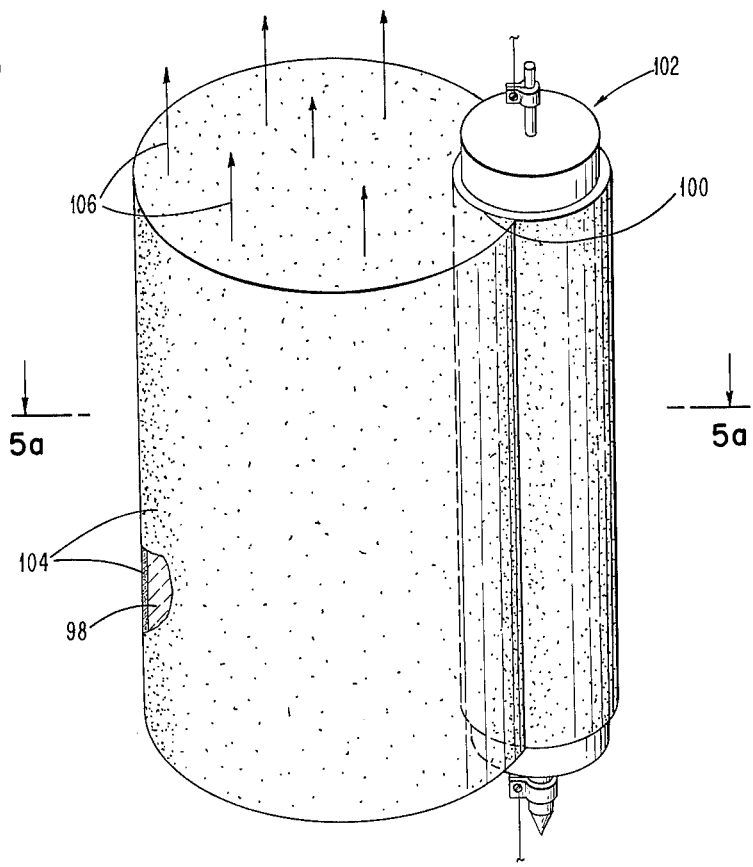
Figure 5A:
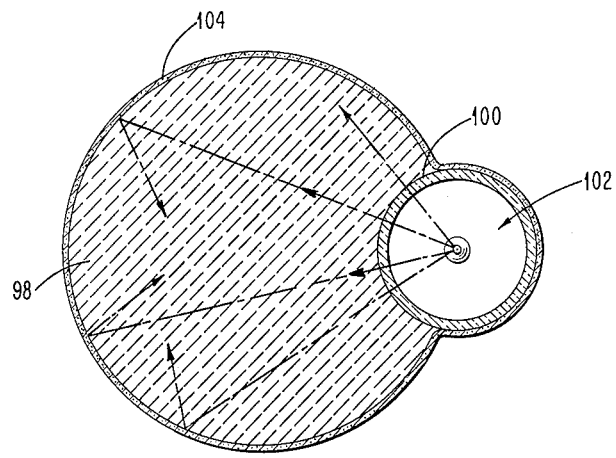

In the drawings:
FIG. 1 illustrates an active element and a pumping source of an embodiment of a laser of the present invention,
FIG. 2 is a cross-sectional view of the pumping source illustrated in FIG. 1,
FIG. 3 is a circuit diagram, primarily in block form, for providing voltages for the pumping source illustrated in FIGS. 1 and 2,
FIG. 4 illustrates a second embodiment of a laser when operated at extremely low temperatures in accordance with the present invention,
FIG. 4a is a cross-sectional view taken through the line 4a in FIG. 4,
FIG. 5 illustrates a third embodiment of a laser of the present invention, and
FIG. 5a is a cross-sectional view taken through the line 5a in FIG. 5.

Referring to the drawing in more detail, FIG. 1 illustrates an embodiment of a laser which includes a hollow cylindrical solid state active or negative temperature medium 10, for example, aluminum oxide doped with chromium, commonly called a ruby medium. A pumping source 12 is disposed concentrically within the medium 10. The source 12 is provided with first and second electrodes 14 and 16, a transparent tube 18, a first plug 20 inserted into one end of the tube 18 and a second plug 22 inserted into the other end of the tube 18. The first and second electrodes 14 and 16 are disposed within the first and second plugs 20 and 22, respectively. First and second clamps 24 and 26 are attached to the first and second electrodes 14 and 16, respectively, for providing electrical connections from a high voltage source, to be described hereinbelow in connection with the circuit illustrated in FIG. 3 of the drawing. A reflective coating 28 is provided on the circumferential outer surface 10 of the active medium 10 for reflecting pumping radiation produced by the pumping source 12. The end of the active medium 10 adjacent the first plug 20 of the pumping source 12 and the end of the active medium 10 adjacent the second plug 22 have applied thereto reflective coatings 30 and 32, respectively, for reflecting all but one or two percent of the coherent radiations produced within the active medium 10 and incident thereon. If desired, the reflective coating 30 may be omitted so as to permit a substantially greater percentage of the coherent radiation, indicated by the arrows 33, to be emitted without reflection from that end of the medium 10.

Figure 2:
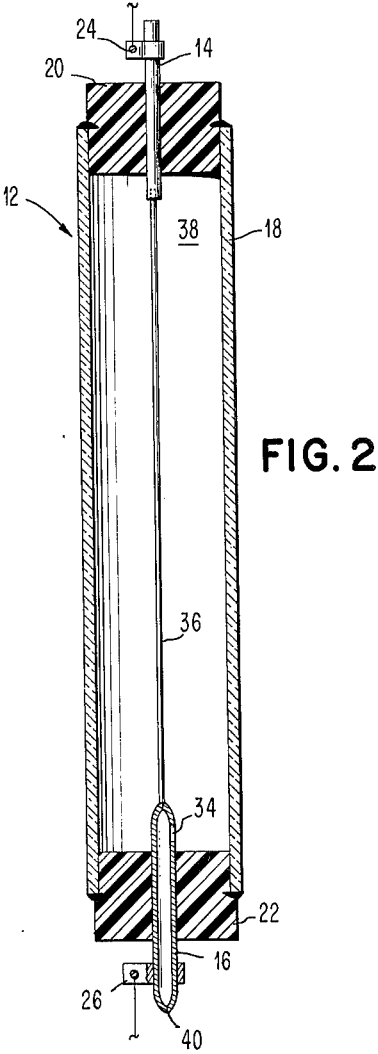

FIG. 2 illustrates in longitudinal cross-section the pumping source 12 shown in FIG. 1 of the drawing. As indicated in FIG. 2 of the drawing, the first electrode 14 is preferably a solid electrode and the second electrode 16 is a hollow electrode having an aperture 34 therein. A wire 36 interconnects the first and second electrodes 14 and 16. The wire 36 is preferably connected to the electrodes 14 and 16 by pressure welding or other connection techniques. A chamber 38 is formed by the transparent tubing 18 and the first and second plugs 20 and 22. The chamber 38 is evacuated through the hollow electrode 16 via aperture 34 by a pumping system (not shown) which may be attached to the second hollow electrode 16. A vacuum may be maintained in the chamber 38 by providing suitable seals, e.g., by use of epoxy, around and within the plugs 20 and 22 and by pinching the hollow electrode 16 so as to provide a closed portion in the tube 18 as indicated at 40.

The transparent tube 18 may be made of quartz of Pyrex, or filter glass, the first and second plugs 20 and 22 are preferably made of an insulating material such as an epoxy resin and the first and second electrodes 14 and 16 and the first and second clamps 24 and 26 are made of a conductive material such as copper, brass or high temperature material such as tungsten. The exploding wire 36 may be made of any desirable material such as tungsten, copper, aluminum, tantalum or molybdenum, as mentioned hereinabove. The electrodes and the wire can also be pressed from powder of any similar conducting materials and any desirable doping of special elements can be introduced therein to enhance the radiation output at desired wavelengths.

The circuit for producing the voltage necessary to explode the wire 36 of the pumping source illustrated in FIG. 2 is shown in FIG. 3 of the drawing. This circuit includes a power supply 42 provided to supply energy to a pair of capacitors 44 through suitable and well known charge circuits 46. The capacitors 44 are connected across an exploding wire 48 through appropriate switching circuits 50, to which a terminal 52 may be connected for supplying a synchronizing trigger pulse, indicative of the instant of explosion of the wire, from the switching circuits 50 to any suitable auxiliary apparatus (not shown), such as an oscilloscope. These switching circuits may include a variable inductance to provide for a control over the duration of the radiation pulse. The exploding wire 48 indicated in FIG. 3 of the drawing may more specifically be the exploding wire 36 illustrated in FIG. 2 of the drawing and the electrical connections from the capacitors 44 via the switching circuits 50 may be made to the first and second clamps 24 and 26 shown in FIGS. 1 and 2.

In the operation of the ruby laser illustrated in FIGS. 1, 2 and 3 of the drawing, the power supply 42 and the charging circuits 46 produce a high voltage, e.g., between 3,000 and 5,000 volts, across the two capacitors 44. When it is desired to produce a pulse of coherent radiation, which, as is known, is in the red portion of the electro-magnetic spectrum, from the ruby laser, the switching circuits 50 complete the electrical circuit between the capacitors 44 and first and second clamps 24 and 26 to supply large currents, in the order of many thousands of amperes, to the wire 36 to produce the explosion of the wire 36 and the resulting pumping radiation. This pumping radiation is preferably of a wide frequency band corresponding to the absorption band of the ruby laser. The pumping radiation passes through the active medium 10 from the chamber 38 of the pumping source 12 to the reflective coating 28 and is then reflected back into medium 10 by the coating 28. The thickness of the ruby tube 10 should be chosen so that at least 80% of the pumping radiation is absorbed during these two passages through the ruby material. The chromium atoms of the active medium 10 are excited by the pumping radiation and an intense coherent red output radiation 33 is emitted from the laser.

It was found that when the wires were exploded in air the radiations produced therefrom were degraded by a factor of 5 to 10 compared to the radiations from the exploding wires when exploded in a vacuum. It is believed that this difference is due to the large fraction of the electrical energy dissipated in dissociating and exciting the air molecules. In vacuum explosions all of the electrical energy is utilized in the molecules of the wire material. The vacuum in which the wires were exploded was in the pressure range from 1 to 50 microns of mercury. At an upper limit of about 1 mm. of mercury the energy losses to the air can become excessive and explosions of the tube or envelope become rather frequent. A pressure of about 1 micron of mercury has the advantage that it can be attained with a good force pump. When ultraviolet radiation is desired the tube or envelope is preferably made of quartz. The envelope should in any event be made, of course, of a quality and thickness to withstand the stress of the explosion. The diameter of the transparent tube or the diameter of the space bounded by the tube is an important factor in the consideration of the spectral characteristic of the radiation output from the exploding wire. In general, the larger the diameter of the tube or of the enclosed volume the greater is the line spectral characteristic of the emission. As this diameter decreases the more closely the spectrum approaches a continuum. It was found that in the diametral range from 3 to 2.5 cm. the radiation had a distinct spectral line characteristic and in the diametral range from 2 to 1.0 cm. the continuous character dominated. Thus, it can be seen that when exploding the wire in a vacuum either narrow or broad band pumping may be produced from a given wire.

The wire to be exploded is chosen for its particular spectral output in the narrow band mode of operation or for its physical strength. The length and diameter are primarily determined by the available power and the required output. The range of lengths of wire is preferably from 0.5 to 4 cm. and the range of the diameters is preferably from 0.0005 to 0.05". A thickness of about 0.01 produces the best continuum and in general shorter wires provide greater integrated intensity. When voltages from approximately 3000 to 5000 volts were applied to the wires it was found that in general the intensity increased with an increase in voltage. The length of the radiation pulses varied from about 50 to 300 microseconds depending upon the wire used and the value of the variable inductance in the switching circuit.

The intensity of the continuum produced by exploding the wire in a vacuum was compared with known or standard radiation sources producing radiations particularly in the ultraviolet region of the spectrum and found to be more intense than prior art sources by a factor of 10 to 100 depending on the wavelengths at which observations were made. Other advantages of the exploding wire in a vacuum were found to be that the output is more uniform in time, focusing is possible by glowing the wire and the exploding wire source can be operated in a nitrogen or helium bath.

In FIG. 4 of the drawing there is illustrated a second embodiment of a laser of the present invention when operated at cryogenic temperatures. The laser in FIG. 4 includes a dewar 54 having an outer metallic wall 56 and an inner metallic wall 58 forming a chamber 60 containing a vacuum. Disposed within the inner wall 58 is a glass support wall 62 having applied to its inner surface a reflective coating 64, which, for example, may be made of aluminum. The transverse cross-sectional view of the support wall 62 is in the form of an ellipse, as shown in FIG. 4a. At one focal point of the ellipse there is disposed an active or negative temperature medium, for example, a ruby rod 66 in an elongated form having a length of about 20 or more centimeters. The rod 66 may have a uniform cylindrical cross-section substantially throughout its entire length with a prism section 68 provided at the lower end thereof for reflecting, by known internal reflection techniques, coherent radiation produced within the rod toward the upper or output end of the rod 66. Disposed at the other focal point of the ellipse formed by the reflective coating 64 is an exploding wire source 70 of the type illustrated in FIGS. 1 and 2 of the drawing. The source 70 is substantially surrounded by a vacuum chamber 72 formed by first and second glass walls 74 and 76, respectively. A base 78 is located at the lower portion of the dewar 54 so as to support the glass support wall 62, the laser rod 66, the radiation source 70 and the first and second glass walls 74 and 76. A cover 80 is provided at the upper portion of the dewar 54 having a window 82 therein through which coherent radiation from the laser rod may be transmitted, an opening 84 in which the radiation source 70 and the vacuum chamber 72 are inserted and a port 86 through which a gas, for example, gaseous nitrogen may be introduced into the space 88 formed by the reflective coating 64, the base 78 and the cover 80 for preventing the formation of condensations in this space 88. The base 78 and the cover 80 may be made of a resin and the upper surface of the base 78 and the lower surface of the cover 80 may have first and second reflective coatings 90 and 92 applied thereto. A cryogenic liquid 94, for example, liquid helium or liquid nitrogen, is disposed between the inner wall 58 and the glass support wall 62. A passageway 96 is provided in the lower portion of the dewar 54 to permit an electrode of the radiation source 70 to pass therethrough.

In the operation of the laser illustrated in FIGS. 4 and 4a the radiation source 70 is exploded so as to produce, preferably, a continuum of radiations which travel radially from the source 70 to the reflective coating 64 where the rays are reflected toward the ruby rod 66 to excite therein the chromium atoms to thus produce coherent radiations characteristic of the ruby laser. Since the intensity of the radiation produced in the ruby rod increases approximately as the square of its length and since the intensity thereof is enhanced at cryogenic temperatures it can be seen that this embodiment of the laser of the present invention produces an extremely intense coherent radiation pulse. Furthermore, it can be seen that the pumping radiation source 70 may have a length equal to the length of the ruby rod 66 so as to provide pumping radiations to substantially all portions of the long ruby rod 66.

In FIG. 5 there is illustrated a third embodiment of the laser of the present invention and FIG. 5a shows a cross-sectional view thereof taken through line 5a of FIG. 5. In this third embodiment an active or negative temperature medium 98 is provided with a circular groove 100, in which there is disposed an exploding wire source 102 of the type illustrated in FIGS. 1 and 2. The groove 100 has a cross-sectional curvature corresponding to the cross-sectional curvature of the outer surface of the exploding wire source 102. A reflective coating 104, shown partly broken away to indicate the presence of the active medium 98, is provided so as to surround both the active medium 98 and the radiation source 102. The reflective coating at the upper end of the active medium 98 may be made so as to permit 1 or 2% of the incident coherent radiation, indicated by arrows 106, to pass therethrough. If desired, the reflective coating 104 may be entirely omitted from the upper end of the active medium 98.

In the operation of the laser illustrated in FIGS. 5 and 5a radiations emanating from the source 102 pass through the active medium 98 to the reflective coating 104 where they are reflected back into the active medium 98. Well known internal reflection prisms and other configurations may be substituted for the coating 104. As the active atoms in the active medium 98 become excited, coherent radiation is produced therein. It can be seen that this laser provides a longer path for the pumping radiation so as to assure that all the pumping radiation is absorbed within the active medium 98. The rod or active medium 98 may have considerable length, for example, 20 cm. or more and the surfaces thereof should be polished. This laser can be readily operated at liquid nitrogen or liquid helium temperatures.

Frequently, as for example in case of ruby or $CaF_2:Sm^{+2}$ masers the quantum efficiency for the pumping radiation increases as the temperature of the laser material is lowered. The advantage of the present invention is that the high intensity pumping source can be immersed directly into cryogenic liquid used to cool the laser material. Thus, highly efficient coupling of the pumping source to the laser medium can be accomplished even in cryogenic environments. Conventional light sources use xenon, mercury or other gases that condense at liquid nitrogen and lower temperatures and therefore cannot be used in low temperature environments. As a result, all prior art lasers use conventional pumping sources operated at room temperature even though the laser material itself may be at a cryogenic temperature.

Accordingly, it can be seen that highly efficient radiation sources have been provided which produce both incoherent and coherent radiations having an intensity substantially greater than any of the prior art radiation sources. Although wires made of certain materials have been specifically mentioned hereinabove, it should be understood that the invention is not limited to the use of the wires mentioned. Furthermore, it should be understood that the active medium may be other than the ruby medium mentioned hereinabove, for example, calcium fluoride doped with trivalent uranium or divalent samarium may also be used.

While the invention has been particularly shown and described with reference to preferred embodiments thereof, it will be understood by those skilled in the art that various changes in form and details may be made therein without departing from the spirit and scope of the invention.

What is claimed is:
1. A radiant energy source comprising:
 (a) a pumping source including a wire encapsulated in a vacuum and means for exploding said wire in said vacuum so as to produce intense output radiations therefrom at optical frequencies and
 (b) a negative temperature medium disposed to intercept said output radiations; said output radiations at said optical frequencies including pumping frequencies for said negative temperature medium.
2. A radiant energy source comprising:
 (a) a pumping source including a wire, means for providing a vacuum around said wire and means for exploding said wire in said vacuum so as to produce intense narrow line output radiations therefrom at given optical frequencies and
 (b) a negative temperature medium having an absorption band at said given frequencies, said output radiations having an intensity sufficient to produce coherent radiations in said negative temperature medium.

3. A radiant energy source as set forth in claim 2 further including means for producing cryogenic temperatures, said pumping source and said negative temperature medium being disposed within said cryogenic temperature producing means.

4. A radiant energy source as set forth in claim 2 wherein said pumping source further includes a reflector having an elliptical transverse cross-section, said wire being disposed at one focal point of the ellipse formed by said reflector and the negative temperature medium being disposed at the other focal point of said ellipse.

5. A radiant energy source as set forth in claim 4 wherein said negative temperature medium is aluminum oxide doped with chromium.

6. A radiant energy source comprising:
   (a) a negative temperature medium having an opening therein and
   (b) a pumping radiation source for producing output radiations having a wire encapsulated in a vacuum and means for exploding said wire in said vacuum, said pumping radiation source being disposed in said opening so as to apply said output radiations therefrom to said negative temperature medium, said output radiations being intense narrow line radiations at pumping frequencies for said negative temperature medium.

7. A laser comprising:
   (a) a negative temperature medium having an opening therein and an absorption band in a given range of frequencies and
   (b) a pumping radiation source including a wire characterized upon explosion by radiations of said given range of frequencies, means for producing a vacuum around said wire and means for applying to said wire a voltage having a magnitude sufficient to explode said wire in said vacuum to produce intense narrow line output radiations, said pumping radiation source being disposed in said opening so as to apply the radiations therefrom as pumping energy to said negative temperature medium to produce coherent radiations therein.

8. A radiant energy source as set forth in claim 7 wherein said negative temperature medium has the form of an elongated cylinder having a concentric opening.

9. A laser comprising:
   (a) a pumping source including a pair of spaced apart electrodes, a wire interconnecting said electrodes, a transparent tube surrounding said wire, first and second plugs inserted in the respective ends of said transparent tube, said pair of electrodes being imbedded in said first and second plugs, respectively, means for evacuating the chamber formed by said transparent tube and said first and second plugs and means for applying a voltage to said electrodes to explode said wire in said evacuated chamber to produce intense output radiations therefrom,
   (b) a negative temperature medium having a pair of flat opposite ends arranged parallel to each other and disposed to intercept output radiations from said source, said output radiations being at pumping frequencies for said negative temperature medium,
   (c) a first radiation reflector disposed at the outer surfaces of said negative temperature medium communicating between the ends thereof and
   (d) a second radiation reflector disposed at one of the ends of said negative temperature medium.

10. A laser as set forth in claim 9 wherein said negative temperature medium is aluminum oxide doped with chromium.

11. A laser comprising:
    (a) an elongated pumping source including an evacuated housing having a transparent cylinder, a wire disposed in said housing along the longitudinal axis of said cylinder and means for exploding said wire in said evacuated housing to produce intense output radiations therefrom and
    (b) an elongated negative temperature medium having flat parallel ends and a longitudinal groove, said pumping source being disposed within said groove to apply said output radiations as pumping energy to said negative temperature medium.

12. A laser as set forth in claim 11 wherein said negative temperature medium is aluminum oxide doped with chromium.

13. A laser as set forth in claim 11 further including:
    (a) a first radiation reflector disposed at one end of said negative temperature medium and
    (b) a second radiation reflector disposed between the ends of said negative temperature medium and surrounding said negative temperature medium and said pumping source.

References Cited by the Examiner

UNITED STATES PATENTS

| 2,929,222 | 3/1960 | Schawlaw et al. | 250—199 |
| 3,059,117 | 10/1962 | Boyle et al. | 250—211 |
| 3,060,710 | 10/1962 | Bennett | 67—31 |
| 3,067,601 | 12/1962 | Anderson et al. | 67—31 |
| 3,102,920 | 9/1963 | Sirons | 88—1 |

OTHER REFERENCES

Bushor: "Sun and Exploding Wires Pump Lasers," Electronics, vol. 35, No. 13, Mar. 30, 1962.

Conn: "The Use of 'Exploding Wires' as a Light Source of Very High Intensity and Short Duration," Journal of The Optical Society of America, vol. 41, No. 7, July 1951.

Korneff et al.: "Exploding Wire Phenomena at Reduced Pressures," Paper given at Air Force Cambridge Research Center in Boston, Mass., on Apr. 2 and 3, 1959, now among the collected papers in Exploding Wires, ed. by Chance and Moore, Plenum Press, Inc., New York, 1959, pp. 104–117.

Vogel et al.: "Lasers: Devices and Systems—Part I," Electronics, vol. 34, No. 43, Oct. 27, 1961.

JEWELL H. PEDERSEN, *Primary Examiner.*

R. L. WIBERT, *Assistant Examiner.*